United States Patent [19]

Gehman et al.

[11] 3,836,960
[45] Sept. 17, 1974

[54] SENSOR SYSTEM

[75] Inventors: John B. Gehman, La Jolla; Joseph V. J. Ravenis, San Diego, both of Calif.

[73] Assignee: General Dynamics Corporation, St. Louis, Mo.

[22] Filed: Mar. 12, 1970

[21] Appl. No.: 24,442

[52] U.S. Cl. ............... 343/5 PD, 324/6, 340/258 B, 343/5 SA
[51] Int. Cl. ............................................... G01s 9/02
[58] Field of Search ............ 343/5 PD, 5 SA; 324/6, 324/41, 71 NE; 340/258 B

[56] References Cited
UNITED STATES PATENTS

| | | | |
|---|---|---|---|
| 2,647,256 | 7/1953 | Heilpern et al. | 343/5 R |
| 3,289,202 | 11/1966 | Preti | 343/5 PD |
| 3,344,419 | 9/1967 | Lund | 343/5 SA |
| 3,392,384 | 7/1968 | Wesch | 324/6 X |
| 3,541,551 | 11/1970 | Bystrom, Jr. et al. | 343/5 PD |

*Primary Examiner*—Malcolm F. Hubler
*Attorney, Agent, or Firm*—Martin LuKacher

[57] ABSTRACT

A sensor system suitable for use as an intrusion detector or metal detector is described. The system transmits CW signals in the VHF or UHF frequency bands and receives modulation components of these signals which are being re-radiated from metal to metal bodies that are in contact with each other in or on the object to be detected. When the amplitude of these re-radiated modulation components exceeds a predetermined threshold, the presence of the object is indicated.

22 Claims, 5 Drawing Figures

INVENTOR.
JOHN B. GEHMAN AND
JOSEPH V. J. RAVENIS

BY

ATTORNEY

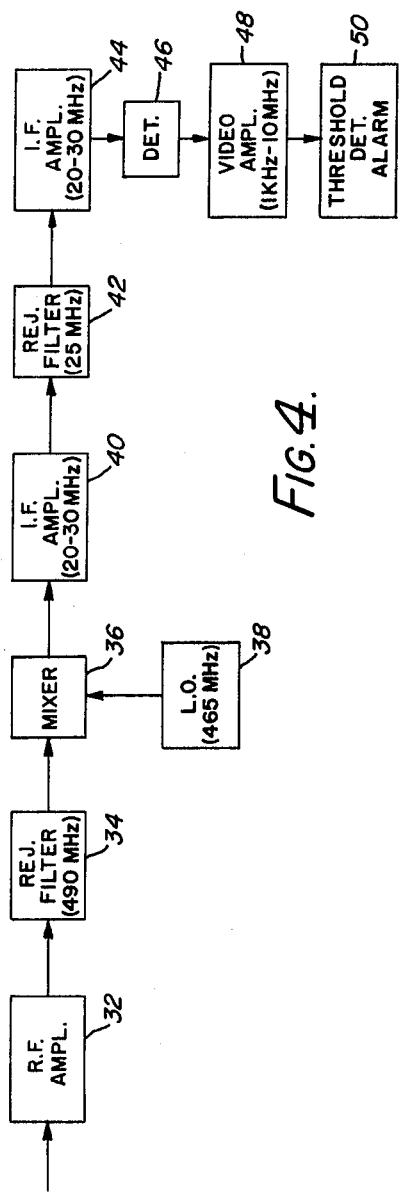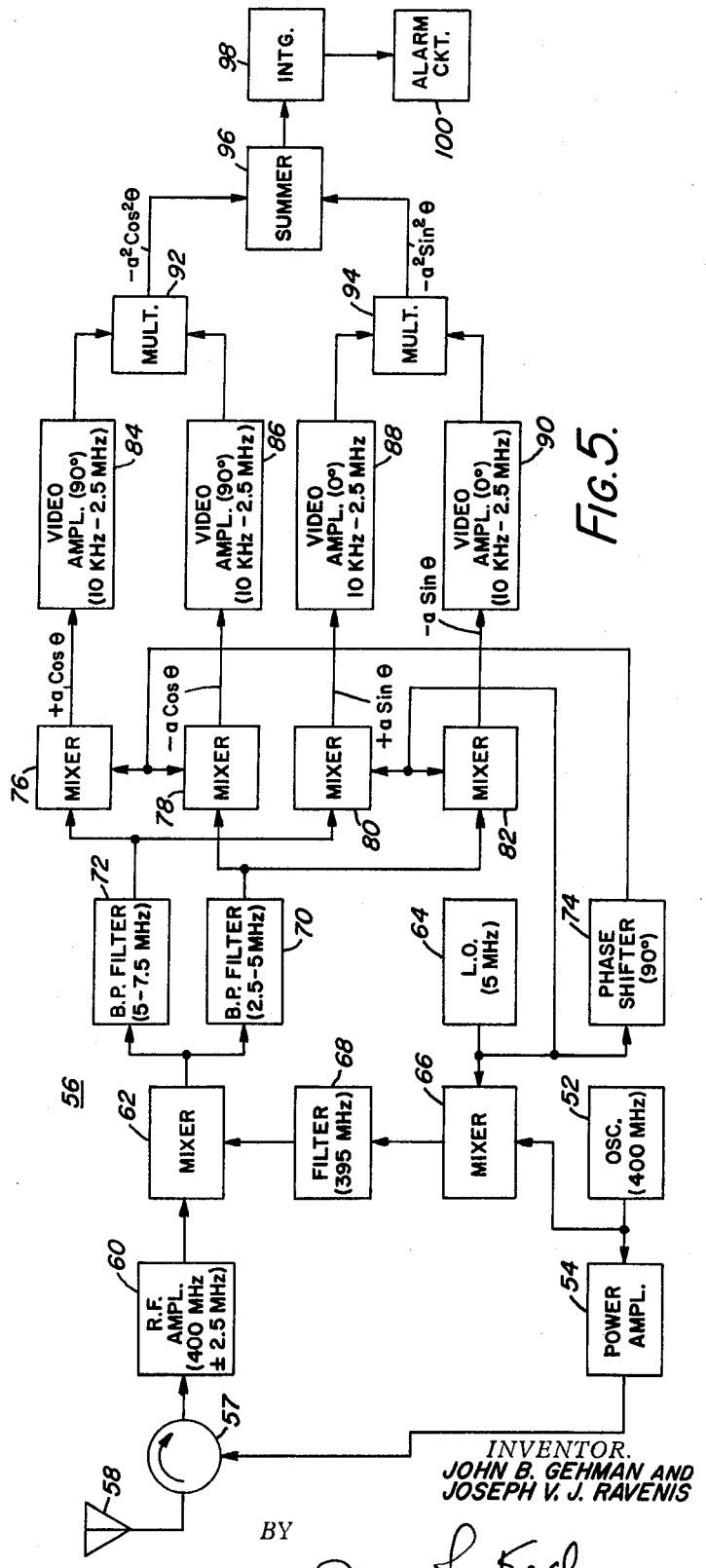

SENSOR SYSTEM

The present invention relates to sensor systems and particularly to intrusion and metal detector systems.

The present invention is especially suitable for use in an intrusion detection system and in systems for detecting metal objects that may be hidden underground or otherwise under cover. Both personnel carrying metal and vehicles may be detected. The invention may therefore be used to provide an ambush detection system since it is operative to detect concealed objects, even if hidden behind dense foilage or rising terrain.

Various systems have been proposed for use as intrusion detectors. These include doppler radar, audio and seismic sensors and devices which are responsive to perturbations in an electromagnetic or acoustic field. Most of these detectors are large in size and not readily portable. Many require a significant amount of motion of the object in order to detect it. Thus, they are not very effective in detecting field objects and are not suitable for use as ambush detectors. Another drawback of some detection systems is the requirement for high power radiated energy. Some require complex antenna systems; thus, leading to large size, heavy weight and installation complexities.

It is an object of the present invention to provide an improved sensor system suitable for use as an object detector when the foregoing difficulties and disadvantages are substantially eliminated.

It is a still further object of the present invention to provide an intrusion detection system which requires only low power to be radiated and which may be implemented by equipment which is simple to fabricate and may be produced at relatively low cost.

It is a still further object of the present invention to provide an improved object and/or metal detector which is highly sensitive and may detect objects, even though they are small in size.

It has been discovered in accordance with the invention that when a plurality of conductive elements undergo intermittent electrical contact while in an electromagnetic field as may be caused by the radiation of a CW signal in the vicinity of the element, a broadband re-radiation noise signal is received. The received signal power about the transmitter frequency increases when the elements move into and out of contact with each other. More specifically, the amplitude modulation components (sidebands of noise modulation) which are generated are uniquely useful in determining the presence or absence of the object. In other words, the re-radiated or return power is related to the absence or presence of the object by virtue of the intermittent and perhaps incidental contact between metal elements thereof. Such contact is normally present and may result even from thermally induced agitation, vibration of the ground or the like. As will be explained more fully hereinafter, the signal which is re-radiated is found most useful if the incident signal has a half-wavelength approximately equal to the length of the elements which contact each other. Thus, VHF frequencies may be used for detecting relatively long contacting parts as in vehicles, while UHF range frequencies will be found useful for personnel detection, since smaller conductive elements are normally carried by personnel.

Briefly described, a system embodying the invention includes means for transmitting the electromagnetic wave which is then re-radiated from the object or target as a return signal. Means, such as a receiver which is responsive to the noise spectrum of the return (the contacting elements may be considered to noise modulate the incident signal and provide a noise modulated re-radiated signal), is provided for indicating the presence of the object.

The invention itself, both as to its organization and method of operation, as well as additional objects and advantages thereof will become more readily apparent from a reading of the following description in connection with the accompanying drawings in which:

FIG. 4 is a block diagram of the receiver shown in FIG. 1; and

FIG. 5 is a more detailed block diagram of a sensor system embodying the invention.

Figure 1:
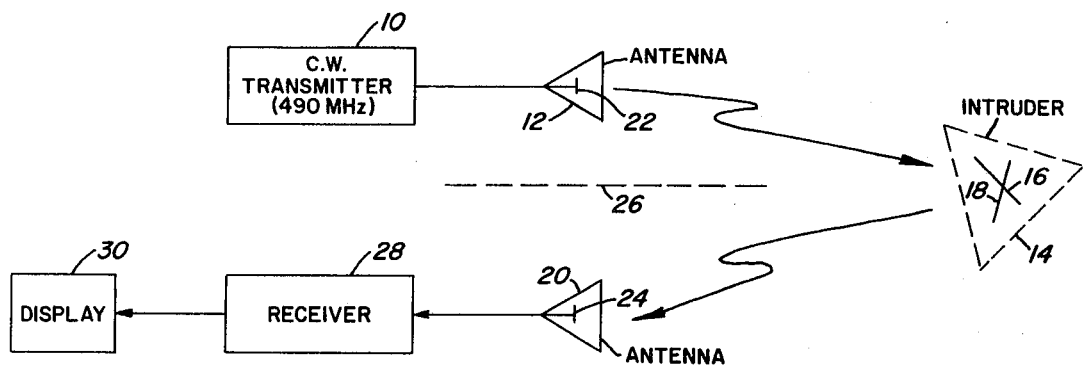
FIG. 1 is a schematic diagram generally illustrating a system embodying the invention.

Referring more particularly to FIG. 1, there is shown a transmitter 10 which generates a continuous wave (CW) signal in the UHF band, a frequency of 490 MHz being suitable for purposes of illustration. This signal is propagated by means of a directional antenna 12 in the direction of the target 14, such as an intruder which has conductive (e.g., metallic) elements 16 and 18 which are adapted to become into intermittent contact with each other. Such conductive elements may be metal parts of bodies which may be physically separable but touching, such as grenades, coins, ammunition rounds and the like. These objects may be brought into contact even by such minute movements as breathing or slight earth shock waves.

A signal is re-radiated from the target 14 and is received by a directional antenna 20 which is desirably isolated from the transmitting antenna 12. This isolation may be obtained by cross-polarization of the transmitting and receiving elements 22 and 24 of the antennas 12 and 20 as shown in the drawing. The antennas themselves may be simple dipoles, even combined in the same parabolic reflector, the dipole elements 22 and 24 being at right angles to each other so as to be responsive to signals having different polarization. This cross polarization provides isolation. Other means of isolation such as shielding as indicated by the dash line 26 may be provided between the antennas.

The receiving antenna 20 is connected to the input of a receiver 28. The receiver is responsive to noise spectrum of the re-radiated signal and may show this spectrum on a display 30 such as a simple CRT tube oscilloscope. Alternatively, the receiver may include circuits responsive to the amplitude modulation components (viz. the sidebands) of the received re-radiated signal. When the sum of the power in the sidebands exceeds a predetermined threshold, the display, which may be an alarm (visual or aural) is then activated to indicate the detection of the object. The system therefore provides an intrusion detector and is also suitable for use as a metal detector. Any contact between conductive elements in the target area will be detected.

Figure 2:
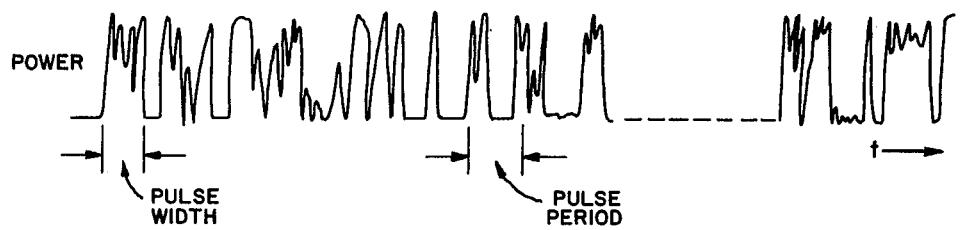
FIG. 2 is a waveform diagram showing the signal power of the re-radiated signal and illustrating the noise modulation components on which the sensing of the object is based.

The signal which is re-radiated or returned to the receiver is exemplified in FIG. 2 which shows the signal power versus time characteristic thereof. Each time a contact or separation or perceptible motion of the contacting elements 16 and 18 occurs, a train of sharp noisy pulses is produced. These pulses may exist over the period of mechanical contact (e.g. 5–15 milliseconds). Individual pulse width may vary from 0.05 to 0.5 milliseconds. The pulses repeat and may repeat about every half millisecond. The amount of received power level may be relatively small because of the low density cycle. However, it has been found that 1 milliwatt of radiated power is sufficient to produce a detectable re-radiated signal. The amount of actual power will depend, of course, upon the terrain (viz. the thickness of foliage or the amount of earth or foliage which must be penetrated by the signal before reaching the target in the case of an underground detecting device and relative polarization. It is also possible to provide pulse rather than CW transmission and reception of the signal is then useful in providing information respecting the range of the target and gating out unwanted signals. Power requirements also is a function of the detection range, greater power being required for longer range detection. The 1 milliwatt radiated power mentioned above is suitable for detecting objects over a range of 20 to 40 feet from the transmitting/receiving point.

Figure 3:
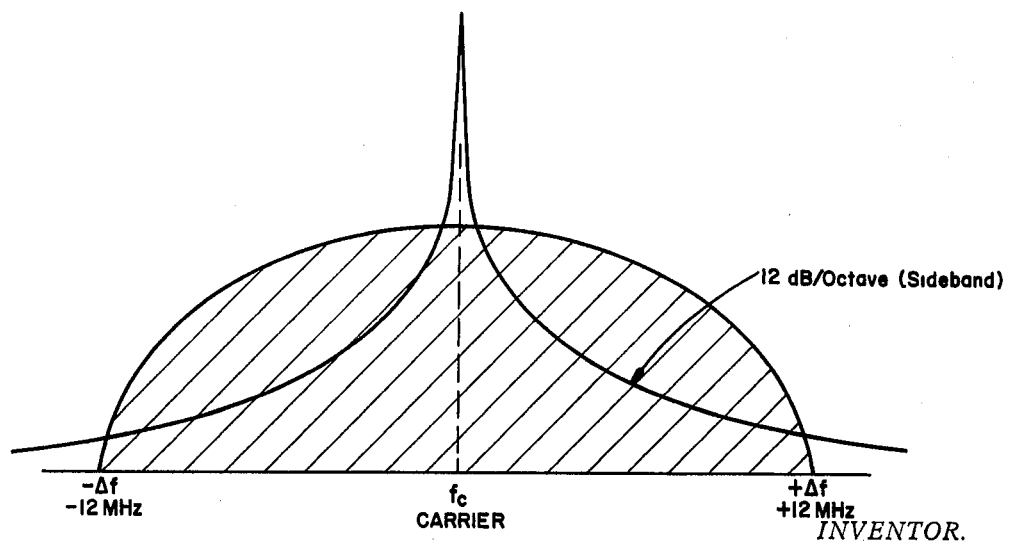
FIG. 3 is a curve illustrating the power spectrum of the re-radiated signal.

The power spectrum of the re-radiated signal is illustrated in FIG. 3. This power spectrum may be obtained by tuning the receiver in a narrow band mode and sweeping over the range about the transmitted frequency $f_c$ (viz. the carrier frequency). The significant power exists in the sidebands from $-\Delta f$ to $f_c$ (which is the lower sideband) and the upper sideband from $f_c$ to $+\Delta f$. This spectrum may be approximately 2.5 MHz on either side of the center frequency or approximately 1 percent of the center frequency. It is believed that a steady electrical contact rather than an intermittent contact would radiate a spectrum of somewhat the same shape. However, the step like transitions in the re-radiated signal produce sidebands of noise modulation. The summed magnitude of the sideband power is a measure of the change in radiated power between the contact states. The frequency range or bandwidth of the spectrum is then related to the time history of the change between states. The amplitude of the spectral envelope will be related to size, shape and conductivity of the metal or conductive elements. Hence target characteristics may be obtained from an analysis of the return signals.

A receiver system for use in the sensor system shown in FIG. 1 is illustrated in FIG. 4. The signal obtained from the antenna is first applied to an RF amplifier 32 which has a band-width broad enough to pass the sideband components (10 MHz being suitable). A rejection or notch filter 34 extracts the carrier and prevents it from being applied to a mixer 36 where it may overload the mixer and the following circuits. A local oscillator 38 provides an injection signal which may suitably be at 465 MHz. The low side mixer products are extracted by an IF amplifier 40. This IF amplifier may suitably have a bandwidth from 20 to 30 MHz and will then pass both the upper and lower sideband noise components of the re-radiated signal; the lower component lying in the band from 20 to 25 MHz and the higher in the band from 25 to 30 MHz. The components are separated from the carrier by means of a notch rejection filter 42 tuned to 25 MHz and the output which contains both sideband components is again amplified in another IF amplifier 44 similar to the amplifier 40. The notch rejection filters 34 and 42 also eliminates any doppler components due to foliage motion and any relative motion of the detection system with respect to its surroundings. It also accenutates the sidebands containing intermittent contact noise.

A video detector 46 extracts the envelope of the IF signal output and the detected envelope is amplified in a video amplifier 48. The output of the video amplifier desirably has a bandpass from 1 KHz to 10 MHz, thereby eliminating any extraneous noise components. It may be desirable to maintain separation between the lower and upper sidebands (viz. the band below 25 MHz and the other band above 25 MHz) and then sum them together at the output of a pair of detectors in separate channels which handle each of the sidebands separately. The amplitude of the total signal available for detection and indication of the object would then be increased. In the illustrated system, however, the total amplitude at the output of the video amplifier, which is the signal envelope amplitude, is applied to a threshold detector 50. If the preset threshold indicative of a significant degree of noise power in the sidebands of the radiated signal is present, an alarm corresponding to the detection of an object (viz. the target or the intruder) is given.

The system shown in FIG. 5 provides the additional feature of eliminating extraneous signals due to other than the noise modulation of the re-radiated signal due to the contact of the conductive elements in the target area. Such signals may, for example, be due to broadcast stations in the band of the transmitted signal.

The system shown in FIG. 5 is operative on the basis that the upper and lower sideband components of the radiated signal will be essentially in phase, whereas signals due to the extraneous inputs may not be in both sidebands or will not be in phase. The extraneous signals are then rejected by means of correlation of the wanted sidebands, as will become more apparent as the description of FIG. 5 proceeds.

The transmitting means of the system is provided by an oscillator 52 which may again operate in the UHF band, a 400MHz CW oscillator being suitable. The output of this oscillator is amplified in a UHF power amplifier 54 and transmitted through an isolator 57 which provides isolation between the transmitter and the receiver 56, to a directional antenna 58.

The receiver 56 includes a radio frequency amplifier 60 which has its input connected to the receiver output of the isolator 57. This amplifier may be broadband enough to pass the expected sideband components of the re-radiated signal (a bandwidth of 400 MHz $\pm$ 2.5 MHz being suitable). The received, amplified re-radiated signal is applied to a mixer 62 together with an injection signal obtained from the transmitter oscillator 52. This injection signal is developed by mixing the output of a local oscillator 64, say a 5 MHz crystal oscillator in a mixer 66 and extracting the lower sideband mixer product in a filter 68. Thus, an injection frequency of 395 MHz is then provided.

The output of the mixer 62 is an IF signal which extends from 2.5 to 7.5 MHz. The lower sideband being contained in the band from 2.5 to 5 MHz and the upper sideband in the band from 5 to 7.5 MHz. Two bandpass filters 70 and 72 separately extract these sidebands and in the process suppress both the carrier and doppler components which occur at and close to 400 MHz (viz. the 5 MHz component).

These two sidebands are correlated with each other. This is accomplished by mixing the sideband components with the equivalent translated transmitted signal, particularly the 5 MHz signal, using its in phase and its quadrature component. Thus, the output of the local oscillator which provides this corresponding signal is passed through a phase shifter 74 to provide the effective quadrature components. The noise modulated re-radiated signal has the equivalent of a carrier added to its modulation components. The carrier will have a fixed phase reference but the modulation components will have a variable phase reference depending upon the distance to the re-radiating source. When the modulation components are in or out of phase with the 5 MHz carrier reference, the signal is equivalent to an amplitude modulated signal. However, if the modulation components are in quadrature with the reference carrier, the signal is equivalent to a phase modulated signal. Therefore by using in phase and quadrature phased mixers, the signals will always have an AM output or portions of which can be added (summed) vectorially to obtain the full modulation component. The correlator includes four mixers 76, 78, 80 and 82. The lower sideband component from the filter 70 is mixed in the mixer 78 with the quadrature component, and in phase component with the local oscillator output in the mixer 82. The mixer 76 mixes the quadrature component and the upper sideband while the mixer 80 mixes the upper sideband component and the in phase component of the local oscillator output.

The outputs of the mixers 76 and 78 which receive the quadrature components as one injection will be the cosine components of the noise modulation indicated as $+a \cos \theta$ and $-a \cos \theta$ while the mixer outputs 80 and 82 due to the in phase component of the local oscillator injection will be the sine components of the noise modulation $+a \sin \theta$ and $-a \sin \theta$ of their respective sideband inputs. Video amplifiers 84, 86, 88 and 90, which pass the band from 10 KHz to 2.5 MHz, extract the outputs of the mixer which now lie in the same frequency band. The signals corresponding to the upper and lower sideband products which are in quadrature with each other are separately multiplied in a pair of multipliers 92 and 94. Since the cosine functions are applied to the multiplier 92, its output is a cosine square function of the sideband products. The multiplier 94 will similarly provide a sine square function. These functions when added together in the summer, such as a resistive network, 96 and will give $a^2\sin^2\theta + a^2\cos^2\theta$ producing $(a^2)$. The multipliers 92 and 94 must have signals in both inputs to each multiplier to have an output. If an extraneous signal occuring either in the upper or lower sideband produce, no output is produced. A complex extraneous signal existing in both sidebands will produce an alternating in and out of phase output. The output of the multipliers is summed and integrated in an integrator 98 which may be provided by an operational amplifier. The integrated modulated signal producing a DC signal is applied to an alarm circuit 100 which may be a threshold detector. A complex extraneous signal producing an AC output produces no DC from the integrator. As was explained in connection with FIG. 4, when the amplitude of this signal is above the preset threshold, which may be obtained by calibration of the system with known objects at known distances, the alarm is sounded and the presence of the object indicated.

From the foregoing description, it will be apparent that there has been provided an improved sensor system which is operative upon a unique principle in accordance with unique techniques, for detecting metal contacting objects, such as intruders, and any objects which may have metal or other conductive bodies which come into contact with each other.

In summary, some of the important features provided are:

1. Common signal source supplies transmitter and receiver (L0) and provides a sharp notch filter which would normally demodulate vibration, as an FM signal, and could not track an oscillator at the high frequencies used (e.g., 60 $H_z$ out of 400 $MH_z$).

2. The upper and lower sidebands are split and maintained in proper phase control throughout the following amplifiers.

3. The use of a four-quadrant multiplier to correlate the upper and lower sidebands. Thus, no output is obtained if there is only one input. A positive output is obtained if inputs are in phase. If inputs are out of phase, a negative output occurs. Different frequencies at the input produce a difference in frequency output which is eliminated in the following integrator.

4. The use of quadrature mixers and dual multipliers to take care of the shifting AM and PM equivalent signals generated at the video mixers as a result of range phase shifts, causing the modulation vectors to add at various phase angles with the reference signal (5$MH_z$). Each of the sine and cosine functions are squared and added, $\sin^2\phi + \cos^2\phi = 1$ (trigonometric identity). Thus, regardless of range the full amplitude modulation output is obtained which would normally have a standing-wave function of range superimposed upon its output with some physical locations giving a partial or zero output, and 5. the integration time constant determines the degree of rejection of signals close to the carrier with AM or FM modulation.

While specific systems and frequencies of operations have been mentioned, as the description has proceeded, it will be understood that this has been done in order to more clearly elucidate the invention. Variations in the signal frequencies and in the components and makeup of the systems within the scope of the invention, will undoubtedly suggest themselves to those skilled in the art. Accordingly, the foregoing description should be taken as illustrative and not in any limiting sense.

What is claimed is:

1. An object detection system which comprises means for transmitting an electromagnetic wave which is re-radiated from said object as a return signal, and means responsive to the noise spectrum of said return system for indicating the presence of said object as a result of incidental contacting of conductive bodies in said object.

2. The invention as set forth in claim 1 wherein said noise spectrum responsive means includes means for deriving outputs which are a function of the amplitude modulation components of said transmitted wave frequency.

3. The invention as set forth in claim 2 wherein said deriving means includes means for filtering said transmitted wave frequency from said outputs.

4. The invention as set forth in claim 3 wherein said filtering means includes means operative to select the upper and lower side bands of said amplitude modulation components to provide said outputs.

5. The invention as set forth in claim 4 wherein said selecting means has upper and lower cutoff frequencies which extend approximately 1 percent on either side of said transmitted wave frequency.

6. The invention as set forth in claim 4 including detecting means operative to provide an indication of the presence of said object when said amplitude modulation components have amplitudes exceeding a certain threshold.

7. The invention as set forth in claim 1 wherein the frequency of said transmitted wave and wavelength is approximately equal to the length of said bodies which are adapted to come into contact with each other.

8. The invention as set forth in claim 1 wherein said noise spectrum responsive means includes a receiver having a broad band response about said transmitted wave frequency.

9. The invention as set forth in claim 8 wherein said transmitting means and said receiver each have inputs which are electrically isolated from each other.

10. The invention as set forth in claim 1 wherein said noise spectrum responsive means includes a directional antenna.

11. The invention as set forth in claim 10 wherein said transmitting means includes an antenna, said responsive means antenna and transmitting means antenna being cross-polarized to provide isolation between said transmitting and responsive means.

12. The invention as set forth in claim 9 wherein said transmitting means and said responsive means are both located at the transmitting point.

13. A sensor system which comprises
   a. means for transmitting a signal, and
   b. means for detecting the noise power spectrum of return signals resulting from said transmitted signal for determining the presence and absence of an object having conductive bodies when they come into contact with each other.

14. The invention as set forth in claim 13 wherein said detecting means includes means responsive to the power contained in a sideband of said transmitted signal.

15. The invention as set forth in claim 14 wherein said sideband power responsive means includes means responsive to the power contained in both of a pair of sidebands which are amplitude modulation components of said transmitted signal above and below the frequency of said transmitted signal.

16. The invention as set forth in claim 15 wherein said transmitting means includes means for providing a CW signal.

17. A system for sensing the presence of an object in response to signals re-radiated from said object due to intermittent contact between conductive bodies therein, said system comprising
   a. means for receiving said re-radiated signal having a bandpass to include upper and lower amplitude modulated sidebands of said signal,
   b. means responsive to said received signal for separating said signal into first and second components and correlating said components with each other to derive an output, and
   c. means responsive to the amplitude of said output for indicating the presence of said object.

18. The invention as set forth in claim 17 including means for generating a signal for transmission to said object which produces said re-radiated signal, and wherein said separating means includes first means for mixing said generated signal with said received signal to provide said first and second components.

19. The invention as set forth in claim 18 wherein said separating means further includes a second means for mixing a third signal with said generated signal to produce an injection signal, and means for applying said injection signal to said first mixing means as said generated signal.

20. The invention as set forth in claim 19 wherein said correlation means includes third means for mixing said third signal and said first and second signals to provide first and second pairs of signals, and means for multiplying signals from different ones of said first and second pairs to provide said output.

21. The invention as set forth in claim 20 wherein said third mixing means includes first, second, third and fourth mixers, means for shifting said third signal 90°, means for applying said third signal and said first component to said first mixer, said third signal and said second component to said second mixer, said phase shifted third component and said first signal to said third mixer and said phase shifted third signal and said second component to said fourth mixer, and wherein said means for multiplying are operative to multiply the outputs of said first and second mixers with each other and the outputs of said third and fourth mixers with each other to provide first and second product outputs.

22. The invention as set forth in claim 21 wherein said correlating means further includes means for summing said first and second product outputs, and means for integrating said summing means output to provide said output indicating the presence of said object.

* * * * *